(12) United States Patent
Kramer

(10) Patent No.: US 6,450,300 B1
(45) Date of Patent: *Sep. 17, 2002

(54) PACKAGING A TEMPERATURE SENSING BRAKE LINING WEAR INDICATOR IN A BRAKE SHOE ASSEMBLY

(75) Inventor: Dennis A. Kramer, Troy, MI (US)

(73) Assignee: Meritor Heavy Vehicle Systems, LLC, Troy, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 09/176,490

(22) Filed: Oct. 21, 1998

(51) Int. Cl.[7] ............................................. F16D 66/00
(52) U.S. Cl. ................................................ 188/1.11 L
(58) Field of Search ...................... 188/1.11 W, 1.11 E, 188/1.11 L

(56) References Cited

U.S. PATENT DOCUMENTS

| | | | |
|---|---|---|---|
| 1,957,051 A | 5/1934 | Norton | 73/32 |
| 2,117,027 A | 5/1938 | Langbein | 73/341 |
| 2,494,269 A | 1/1950 | Sparkes | 177/311 |
| 3,088,549 A | 5/1963 | Borsa | 188/1 |
| 3,314,618 A | 4/1967 | McDonald | 241/299 |
| 3,321,045 A | 5/1967 | Veilleux | 188/1 |
| 3,398,246 A | 8/1968 | Linet | 200/61.4 |
| 3,556,258 A | 1/1971 | Winge et al. | 188/1 |
| 3,674,114 A | 7/1972 | Howard | 188/1 A |
| 3,689,880 A | 9/1972 | McKee et al. | 340/52 A |
| 3,800,278 A | 3/1974 | Jaye et al. | 340/52 A |
| 3,805,228 A | 4/1974 | Peeples | 340/52 A |
| 3,825,891 A | 7/1974 | Kinast | 340/52 A |
| 3,914,734 A | 10/1975 | Rigalt | 340/52 A |
| 3,958,445 A | 5/1976 | Howard et al. | 73/7 |
| 3,975,706 A | 8/1976 | Kato | 340/52 A |
| 4,016,533 A | 4/1977 | Ishikawa et al. | 340/52 A |
| 4,020,454 A | 4/1977 | Malonee | 340/52 B |
| 4,147,236 A | 4/1979 | Steffen et al. | 188/1 A |
| 4,188,613 A | 2/1980 | Yang et al. | 340/52 A |
| 4,204,190 A | 5/1980 | Wiley et al. | 340/52 A |
| 4,241,603 A | 12/1980 | Han et al. | 73/129 |
| 4,298,857 A | 11/1981 | Robins et al. | 340/52 A |
| 4,387,789 A | 6/1983 | Borugian | 188/1.11 |

(List continued on next page.)

*Primary Examiner*—Matthew C. Graham
(74) *Attorney, Agent, or Firm*—Carlson, Gaskey & Olds

(57) ABSTRACT

A brake shoe assembly includes a backing plate and a brake lining. The brake lining has an interface surface abutting the backing plate and a wear surface for contacting a vehicle. A pair of temperature sensors are positioned adjacent to the interface surface and spaced unequal distances from the wear surface for determining the thickness of the brake lining. The pair of temperature sensors may be embedded directly in the brake lining or encapsulated in one of a plurality of housing embodiments packaged in the brake lining. In a preferred embodiment, a unique brake lining temperature sensor assembly is attached to the brake shoe assembly. The unique temperature sensor assembly includes a body of material having a proximate end positioned adjacent to the backing plate and a distal end for contacting the vehicle concurrently with the wear surface of the brake lining. A heat pipe, disposed within the body of material, extends from the distal end toward the proximate end. A first electrical conductor is attached to the heat pipe to form a first thermoelectric junction. A second electrical conductor is attached to the heat pipe to form a second thermoelectric junction spaced from the first thermoelectric junction. The heat pipe provides a thermal communication path from the distal end of the sensor body to the first and second thermoelectric junctions. In this manner, heat waves or fronts, produced when the distal end of the sensor body contacts the vehicle, are transmitted quickly through the heat pipe from the distal end of the sensor body to the first and second thermoelectric junctions and used to determine the thickness of the brake lining.

7 Claims, 2 Drawing Sheets

U.S. PATENT DOCUMENTS

| | | | |
|---|---|---|---|
| 4,508,196 A | 4/1985 | Jamon | 188/1.11 |
| 4,520,661 A | 6/1985 | Tamai et al. | 73/129 |
| 4,562,421 A | 12/1985 | Duffy | 340/52 A |
| 4,604,604 A | 8/1986 | Mann | 340/52 A |
| 4,606,435 A | 8/1986 | Johnson | 188/1.11 |
| 4,641,519 A | 2/1987 | Klein et al. | 73/129 |
| 4,646,001 A | 2/1987 | Baldwin et al. | 324/65 P |
| 4,649,370 A | 3/1987 | Thomason | 340/52 B |
| 4,658,936 A | 4/1987 | Moseley | 188/1.11 |
| 4,674,326 A | 6/1987 | Reinecke | 73/129 |
| 4,685,540 A * | 8/1987 | Rath et al. | 188/1.11 L |
| 4,790,606 A | 12/1988 | Reinecke | 303/103 |
| 4,824,260 A | 4/1989 | Novotny et al. | 374/179 |
| 4,869,350 A | 9/1989 | Fargier et al. | 188/1.11 |
| 4,964,679 A | 10/1990 | Rath | 303/100 |
| 4,971,179 A | 11/1990 | Gabhardt et al. | 188/33 |
| 5,079,947 A | 1/1992 | Feldmanmn et al. | 73/129 |
| 5,151,681 A | 9/1992 | Valmir et al. | 340/454 |
| 5,168,260 A | 12/1992 | Mery | 340/454 |
| 5,189,391 A | 2/1993 | Feldmann et al. | 340/453 |
| 5,302,940 A | 4/1994 | Chen | 340/454 |
| 5,307,673 A | 5/1994 | Ito et al. | 73/129 |
| 5,372,221 A | 12/1994 | Jalbert | 188/1.11 |
| 5,419,415 A | 5/1995 | Lamb et al. | 188/1.11 |
| 5,559,286 A | 9/1996 | White et al. | 73/129 |
| 5,637,794 A | 6/1997 | Hanisko | 73/121 |
| 5,651,431 A | 7/1997 | Kyrtsos | 188/1.11 L |
| 5,668,529 A | 9/1997 | Kyrtsos | 340/454 |
| 5,939,978 A * | 8/1999 | Kyrtsos | 188/1.11 L |

\* cited by examiner

PACKAGING A TEMPERATURE SENSING BRAKE LINING WEAR INDICATOR IN A BRAKE SHOE ASSEMBLY

BACKGROUND OF THE INVENTION

This application relates to packaging a temperature sensing brake lining wear indicator in a brake shoe assembly and to a unique temperature sensing brake lining wear indicator.

Most motor vehicles include a brake system having a set of brake shoe assemblies for retarding the rotation of the wheels of the vehicle when the brakes are applied. Typically, each brake shoe assembly includes a brake lining made of a friction material which gradually wears away during brake applications. After numerous brake applications, the brake lining wears below a critical material thickness and, therefore, must be replaced. As a result, the brake lining must be periodically inspected for excessive wear. To eliminate time-consuming and costly visual inspections of the brake lining, the prior art has taught several types of brake lining wear indicators for indicating when the brake lining must be replaced.

One type of brake lining wear indicator, sometimes referred to as a temperature sensing brake lining wear indicator, monitors the temperature of the brake lining to determine the thickness of the brake lining material. Often, prior art temperature based indicators experience material homogenization and heat transfer problems when embedded in a brake shoe assembly. Accordingly, it would be desirable to package a temperature sensing brake lining wear indicator in a brake shoe assembly so as to overcome the shortcomings of the prior art. A unique temperature sensing brake lining wear indicator designed to overcome the shortcomings of the prior art would also be desirable.

SUMMARY OF THE INVENTION

In a disclosed embodiment of this invention, a brake shoe assembly includes a backing plate and a brake lining. The brake lining has an interface surface abutting the backing plate and a wear surface for contacting a vehicle. A pair of temperature sensors are positioned adjacent to the interface surface and spaced unequal distances from the wear surface for determining the thickness of the brake lining. The pair of temperature sensors may be embedded directly in the brake lining or encapsulated in one of a plurality of housing embodiments packaged in the brake lining.

In accordance with the teachings of the present invention, a brake shoe assembly having a unique brake lining temperature sensor assembly is also disclosed. The brake shoe assembly includes a backing plate and a brake lining. The brake lining has an interface surface abutting the backing plate and a wear surface for contacting a vehicle. The unique temperature sensor assembly includes a body of material having a proximate end positioned adjacent to the backing plate and a distal end for contacting the vehicle concurrently with the wear surface of the brake lining. A heat pipe, disposed within the body of material, extends from the distal end toward the proximate end. A first electrical conductor is attached to the heat pipe to form a first thermoelectric junction. A second electrical conductor is attached to the heat pipe to form a second thermoelectric junction spaced from the first thermoelectric junction. The heat pipe provides a thermal communication path from the distal end of the sensor body to the first and second thermoelectric junctions. In this manner, heat waves or fronts, produced when the distal end of the sensor body contacts the vehicle, are transmitted quickly through the heat pipe from the distal end of the sensor body to the first and second thermoelectric junctions and used to determine the thickness of the brake lining.

These and other features of the present invention will be best understood from the following specification and drawings, the following of which is a brief description.

DETAILED DESCRIPTION OF THE PREFERRED EMBODIMENT

Figure 1:
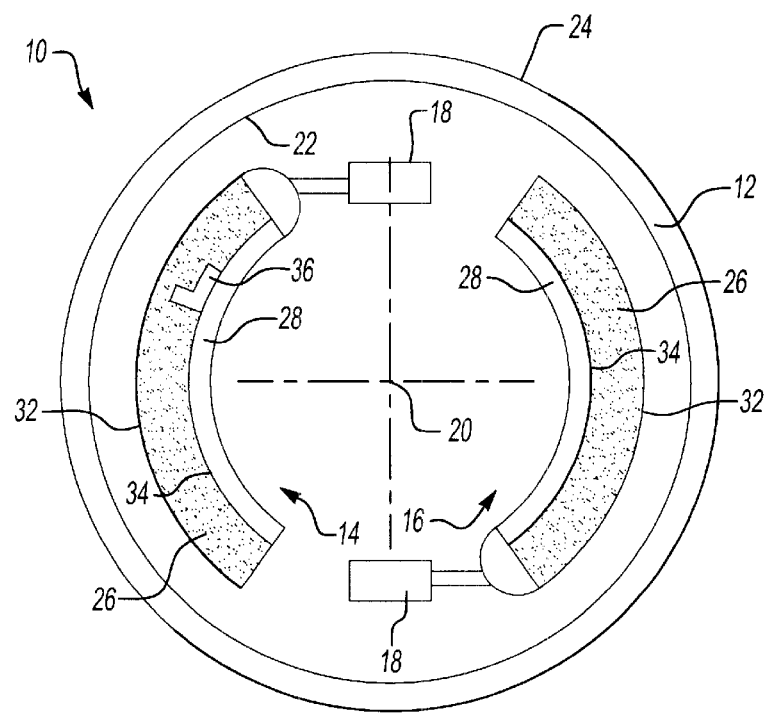
FIG. 1 is a side view of a drum brake system including a brake shoe assembly having a brake lining temperature sensor assembly in accordance with the present invention.

Referring to FIG. 1, a brake shoe assembly having a brake lining temperature sensor assembly in accordance with the present invention is shown installed in a vehicular brake system. The inventive brake shoe assembly, as described below, may be incorporated into several different types of conventional brake systems including, but not limited to, drum brake systems and disc brake systems. Thus, the brake shoe assembly has been illustrated in a drum brake system in FIG. 1 for descriptive purposes only and not to limit the scope of the present invention.

FIG. 1 is a side view of a drum brake system 10. The drum brake system 10 includes a cylindrical brake drum 12, a first brake shoe assembly generally shown at 14, a second brake shoe assembly generally shown at 16, and an actuator 18. The general operation of the brake drum assembly 10 is known. The first and second brake shoe assemblies 14 and 16 are preferably identical such that a description of the first brake shoe assembly 14 or its components is also applicable to the second brake shoe assembly 16. The drum brake system 10 can be of various types of systems such as an s-cam brake, a wedge brake, or a drum brake actuated by a hydraulic cylinder. The actuator 18, shown schematically in FIG. 1, represents any known actuating mechanism for drum brake systems such as an s-cam mechanism, a wedge mechanism, or a hydraulic cylinder. The actuator 18 moves the first and second brake shoe assemblies 14 and 16 into contact with the rotating brake drum 12 and can be controlled hydraulically or pneumatically. As known, a single actuator may also actuate both brake shoe assemblies 14 and 16.

The brake drum 12, which rotates about an axis of rotation 20, has an inner surface 22 and an outer surface 24. The first and second brake shoe assemblies 14 and 16, located adjacent to the inner surface 22 of the brake drum 12, include a brake lining 26 having a predetermined thickness. The brake linings 26 are comprised of a known friction material attached to a backing plate 28. Each brake lining 26 presents a wear surface 32 which contacts the inner surface 22 of the rotating brake drum 12 and wears further and further away each time the actuator 18 moves the first and second brake shoe assemblies 14 and 16 against the brake drum 12. After numerous brake applications, the brake linings 26 wear below a critical thickness and, therefore, must be replaced. Each brake lining 26 also includes an interface surface 34 which contacts the backing plate 28.

A brake lining temperature sensor assembly 36 is located on the first brake shoe assembly 14. This temperature sensor assembly 36 can be located on either the first and/or the second brake shoe assemblies 14 and 16, but typically need only be incorporated in the leading brake shoe assembly which experiences the most brake lining wear.

The temperature sensor assembly 36 includes a pair of temperature sensors for determining the thickness of the brake lining 26. A full description of the components and operation of the temperature sensor assembly 36 is disclosed in co-pending U.S. patent application Ser. No. 08/895,979, entitled "Temperature Sensing Brake Lining Wear Indicator", filed on Jul. 17, 1997 and incorporated by reference now U.S. Pat. No. 5,939,978.

In accordance with the scope of the present invention, the brake lining temperature sensor assembly 36 may be packaged in alternative embodiments in the brake lining 26, wherein like numerals are increased by multiples of 100 to indicate like or corresponding parts.

Figure 2:
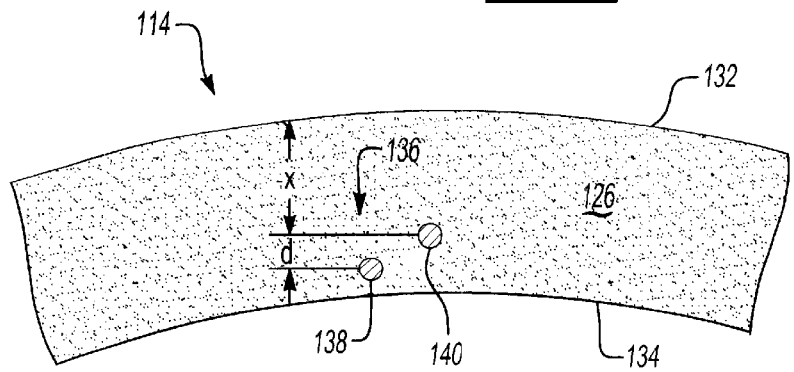
FIG. 2 is a cross-sectional view of a first embodiment of a brake lining temperature sensor assembly in accordance with the present invention.

FIG. 2 is a cross-sectional view of a first embodiment of a brake lining temperature sensor assembly 136 in accordance with the present invention. In this first embodiment, the pair of temperature sensors 138 and 140 are embedded in the brake lining 126 adjacent the interface surface 134 and spaced unequal distances from the wear surface 132. It follows that only one type of material, the brake lining friction material, is disposed between the wear surface 132 of the brake lining 126 and each temperature sensor 138 and 140 or, in other words, that there are no material boundaries or interfaces between the wear surface 132 of the brake lining 126 and each temperature sensor 138 and 140. As a result, heat waves or fronts, produced when the brake shoe assembly 114 contacts the inner surface of the drum brake, are transmitted from the wear surface 132 to each temperature sensor 138 and 140 without experiencing typical heat transfer inconsistencies produced across material boundaries.

Figure 3:
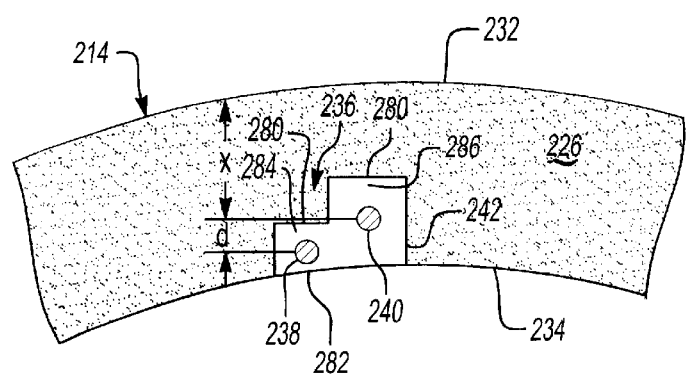
FIG. 3 is a cross-sectional view of a second embodiment of a brake lining temperature sensor assembly in accordance with the present invention.

FIG. 3 is a cross-sectional view of a second embodiment of a brake lining temperature sensor assembly 236 in accordance with the present invention. In this second embodiment, a housing 242 is disposed in the brake lining 226 with a distal end 280 abutting the brake lining 226 and a proximate interface end 282 abutting the backing plate (not shown). The pair of temperature sensors 238 and 240 are encapsulated in the housing 242 adjacent the proximate interface end 282 and spaced unequal distances from said wear surface 232 of the brake lining 226. The housing 242 includes a first layer of thermally conductive material 284 disposed between the first temperature sensor 238 and the distal end 280 of the housing 242 and a second layer of thermally conductive material 286, having a thickness equal to the first layer 284, disposed between the second temperature sensor 240 and the distal end 280 of the housing 242. In this manner, the material composition of a thermal path between the wear surface 232 of the brake lining 226 and the first temperature sensor 238 is consistent with the material composition of a thermal path between the wear surface 232 of the brake lining 226 and the second temperature sensor 240. Preferably, the thermally conductive material is a phenolic resin similar to the brake lining friction material.

Figure 4:
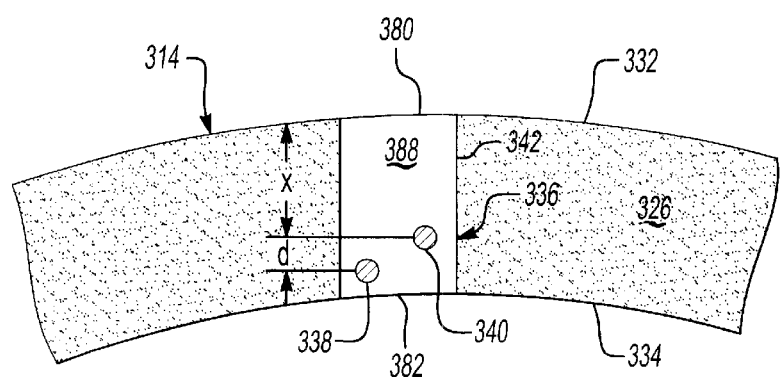
FIG. 4 is a cross-sectional view of a third embodiment of a brake lining temperature sensor assembly in accordance with the present invention.

FIG. 4 is a cross-sectional view of a third embodiment of a brake lining temperature sensor assembly 336 in accordance with the present invention. In this third embodiment, a housing 342 is disposed in the brake lining 326 with a distal wear end 380 flush with the wear surface 332 of the brake lining 326 and a proximate interface end 382 abutting the backing plate (not shown). The pair of temperature sensors 338 and 340 are encapsulated in the housing 342 adjacent the proximate interface end 382 and spaced unequal distances from the distal wear end 380 for determining the thickness of the brake lining 326. In this embodiment, the housing 342 consists of a thermally conductive material 388 for providing a homogeneous thermal communication path from the distal wear end 380 to each temperature sensor 338 and 340 or, in other words, only one type of thermally conductive material is disposed between the distal wear end 380 and each temperature sensor 338 and 340. Preferably, the thermally conductive material 388 is a phenolic resin similar to the brake lining friction material. Depending on the particular application of the present invention, the selected thermally conductive material may have a thermal conductivity approximately equal to the brake lining friction material or the selected thermally conductive material may have a thermal conductivity greater the brake lining friction material.

Figure 5:
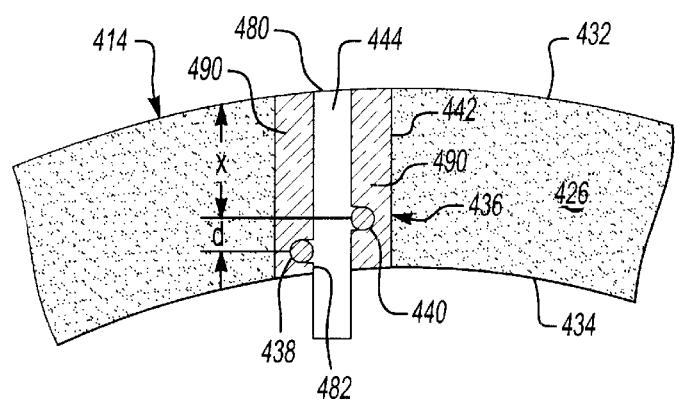
FIG. 5 is a cross-sectional view of a fourth embodiment of a brake lining temperature sensor assembly in accordance with the present invention.

FIG. 5 is a cross-sectional view of a fourth embodiment of a brake lining temperature sensor assembly 436 in accordance with the present invention. In this fourth embodiment, a housing 442 is disposed in the brake lining 426 with a distal wear end 480 flush with the wear surface 432 of the brake lining 426 and a proximate interface end 482 abutting the backing plate (not shown). The pair of temperature sensors 438 and 440 are encapsulated in the housing 442 adjacent the proximate interface end 482 and spaced unequal distances from the distal wear end 480 for determining the thickness of the brake lining 426. In this embodiment, the housing 442 consists of an insulating material 490 having a thermal conductivity approximately equal to the brake lining 426 and includes a heat pipe 444 for providing a rapid thermal communication path from the distal wear end 480 to each temperature sensor 438 and 440. The heat pipe 444 is a device which conducts heat at a much faster rate than the surroundings. Preferably, the insulating material 490 has a thermal conductivity approximately equal to the brake lining friction material and the heat pipe 444 has a thermal conductivity much greater that the brake lining friction material. It is further noted that this fourth embodiment may also be used in conjunction with a brake lining temperature sensor assembly having a single temperature sensor.

Figure 6:
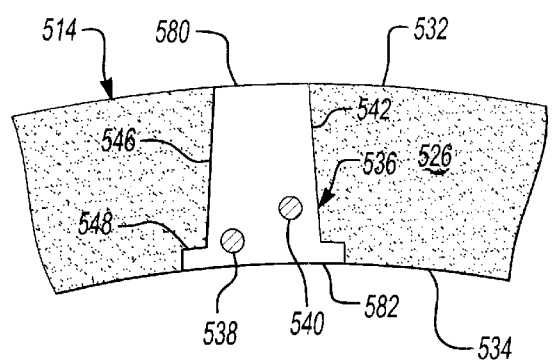
FIG. 6 is a cross-sectional view of a fifth embodiment of a brake lining temperature sensor assembly in accordance with the present invention.

FIG. 6 is a cross-sectional view of a fifth embodiment of a brake lining temperature sensor assembly 536 in accordance with the present invention. In this embodiment, the pair of temperature sensors 538 and 540 are encapsulated in a housing 542 having a tapered plug shape 546 and a shoulder 548 adjacent the proximate interface end 582. The shoulder 548 and tapered plug shape 546 are particularly adapted to secure the housing 542 in the brake ling 526.

Figure 7:
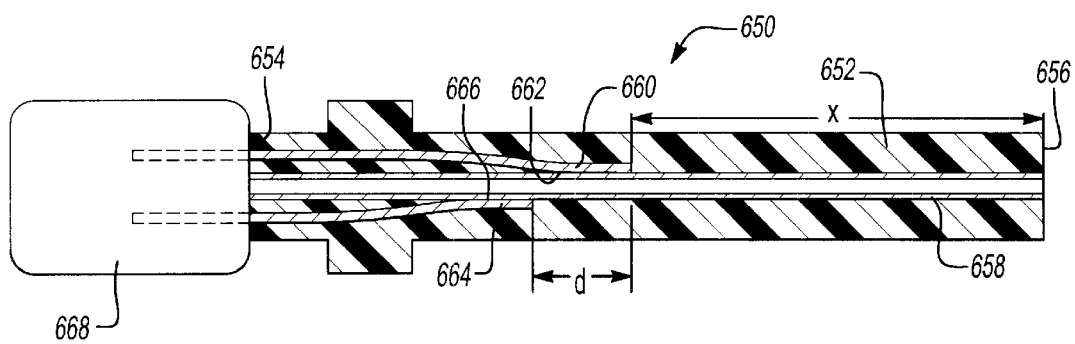
FIG. 7 is a cross-sectional view of a preferred embodiment of a brake lining temperature sensor assembly in accordance with the present invention.

FIG. 7 is a cross-sectional view of a preferred embodiment of a brake lining temperature sensor assembly 650 in accordance with the present invention. The temperature sensor assembly 650 is adapted to be installed in the drum brake system 10 described above. In carrying out the invention, the temperature sensor assembly 650 is positioned to wear away as the brake lining 26 of the first brake shoe assembly 14 gradually wears away during brake applications. Accordingly, the temperature sensor assembly 650 may be located adjacent to the braking lining 26 or embedded in the brake lining 26. The temperature sensor assembly 650 can be incorporated in either the first and/or the second brake shoe assemblies 14 and 16, but typically need only be incorporated in the leading brake shoe assembly which experiences the most brake lining wear.

This preferred temperature sensor assembly 650 includes a body of material 652 having a proximate end 654, positioned adjacent to the backing plate 28 of the first brake shoe assembly 14, and a distal end 656, for contacting the vehicle concurrently with the wear surface 32 of the brake lining 26. The body of material 652 preferably consists of a mineral filled polyester or a high temperature cement. A heat pipe 658 is disposed within the body of material 652 extending from the distal end 656 of the sensor toward the proximate end 654 of the sensor. A first electrical conductor 660 is attached to the heat pipe 658 to form a first thermoelectric junction 662. A second electrical conductor 664 is attached to the heat pipe 658 to form a second thermoelectric junction 666 spaced from the first thermoelectric junction 662. The heat pipe 658 provides a thermal communication path from the distal end 656 of the sensor to the first and second thermoelectric junctions 662 and 666. In this manner, heat waves or fronts, produced when the distal end 656 of the sensor contacts the vehicle, are transmitted quickly through the heat pipe 658 from the distal end 656 of the sensor to the first and second thermoelectric junctions 662 and 666 and used to determine the thickness of the brake lining 26.

The first and second thermoelectric junctions 662 and 666 are in electrical communication with a processor having a timer. One of ordinary skill in the art will recognize that the processor, sometimes referred to as an electrical control unit (ECU), may be selected from many prior art processors well known in the art. The first thermoelectric junction 662 is located a distance X from the distal end 656 of the sensor. The distance X is related to the remaining useful thickness of the brake lining 26. The second thermoelectric junction 666 is located a distance X+d from the distal end 656 of the sensor. The distance "d" is a known constant representing the fixed distance between the first and second thermoelectric junctions 662 and 666. It is important to note that the distance X decreases by a small amount as a result of each brake application. As described above, the temperature sensor assembly 650 is positioned to wear away as the brake lining 26 gradually wears away during brake applications. Thus, after numerous brake applications, the distance X will have significantly decreased and reached a critical amount indicating that the brake shoe assemblies 14 and 16 should be replaced.

To determine the thickness of the brake lining 26 by way of the distance X, the processor monitors the thermally induced, electrical activity of the first and second thermoelectric junctions 662 and 666. When brakes of the vehicle are not actuated, there is typically no thermal or electrical activity at either the first or second thermoelectric junctions 662 and 666. As described above, when the brakes of the vehicle are actuated, the distal end 656 of the sensor contacts the vehicle creating friction. This friction produces heat waves or fronts which are transmitted quickly through the heat pipe 658 from the distal end 656 of the sensor towards the first and second thermoelectric junctions 662 and 666. When the first heat wave reaches the first thermoelectric junction 662, a first electrical current is produced. The first electrical current flows from the first thermoelectric junction 662 to the second thermoelectric junction 666. Soon thereafter, the first heat wave reaches the second thermoelectric junction 666 and a second electrical current is produced. The second electrical current flows from the second thermoelectric junction 666 to the first thermoelectric junction 662, thereby opposing the first electrical current. Thus, when the first heat wave reaches the second thermoelectric junction 666, the opposing first and second electrical currents result in a zero net electrical current flow between the first and second thermoelectric junctions 662 and 666. In this manner, the processor can monitor the electrical activity across the sensor to determine when the first heat wave has reached both the first thermoelectric junction 662 and the second thermoelectric junction 666.

Upon actuation of the vehicle brakes, the timer produces a first time signal $T_1$ in response to timing the period for the first heat wave to reach the first thermoelectric junction 662 and a second time signal $T_2$ in response to timing the period for the first heat wave to reach the second thermoelectric junction 666. The first time signal $T_1$ and the second time signal $T_2$ are used by the processor to calculate the distance X based on either a ratio of the first time signal $T_1$ to the second time signal T2 or the following formula:

$$X = \frac{(T_1)(d)}{T_2}$$

where T is the first time signal, $T_2$ is the second time signal, and "d" is a known constant representing the distance between the first and second thermoelectric junctions 662 and 666.

In this embodiment, the heat pipe 658 preferably has a thermal conductivity greater than the brake lining 26 and the body of material 652 has a thermal conductivity approximately equal to or less than the brake lining 26. It follows that the heat pipe 658 consists of a homogeneous, thermally conductive material, such as constantan. Preferably, the first and second conductors 660 and 664 consist of copper wire and are spot welded to the heat pipe 658 to form the first and second thermoelectric junctions 662 and 666. A connector 668 may be installed on the proximate end 654 of the sensor to facilitate electrical communication between the processor and the first and second conductors 660 and 664.

Preferred embodiments of this invention have been disclosed, however, a worker of ordinary skill in the art would recognize that certain modifications would come within the scope of this invention. For that reason, the following claims should be studied to determine the true scope and content of this invention.

What is claimed is:

1. A brake shoe assembly for a vehicle comprising:
    a backing plate;
    a brake lining having an interface surface abutting said backing plate and a wear surface for contacting the vehicle;
    a body of material having a proximate end positioned adjacent said backing plate and a distal end for contacting the vehicle concurrently with said wear surface of said brake lining;
    a heat pipe disposed within said body of material extending from said distal end toward said proximate end;
    a first electrical conductor attached to said heat pipe to form a first thermoelectric junction; and a second electrical conductor attached to said heat pipe to form a second thermoelectric junction spaced from said first thermoelectric junction;

said heat pipe providing a thermal communication path for transmitting heat waves, produced when said body of material contacts the vehicle, from said distal end to said first and second thermoelectric junctions to determine the thickness of said brake lining.

2. An assembly as set forth in claim 1 in said heat pipe consists of a homogeneous, thermally conductive material.

3. An assembly as set forth in claim 1 wherein said heat pipe has a thermal conductivity greater than said brake lining.

4. An assembly as set forth in claim 1 wherein said heat pipe consists of constantan.

5. An assembly as set forth in claim 1 wherein said body of material has a thermal conductivity approximately equal to or less than said brake lining.

6. An assembly as set forth in claim 1 wherein said first and second conductors consist of copper wire.

7. An assembly as set forth in claim 1 wherein said first and second conductors are spot welded to said heat pipe to form said first and second thermoelectric junctions.

* * * * *